United States Patent
Chou et al.

[19]

[11] Patent Number: 6,061,658

[45] Date of Patent: May 9, 2000

[54] PROSPECTIVE CUSTOMER SELECTION USING CUSTOMER AND MARKET REFERENCE DATA

[75] Inventors: Paul B. Chou, Montvale, N.J.; Edna Grossman, Chappaqua, N.Y.; Dimitrios Gunopulos, San Jose, Calif.; Pasumarti V. Kamesam, White Plains, N.Y.

[73] Assignee: International Business Machines Corporation, Armonk, N.Y.

[21] Appl. No.: 09/078,672

[22] Filed: May 14, 1998

[51] Int. Cl.[7] ........................................ G06F 19/00
[52] U.S. Cl. ............................ 705/10; 707/1; 707/14
[58] Field of Search ......................... 705/1, 10, 14, 705/26

[56] References Cited

U.S. PATENT DOCUMENTS

| | | | |
|---|---|---|---|
| 5,201,010 | 4/1993 | Deaton et al. | 705/14 |
| 5,227,874 | 7/1993 | Kohorn | 705/10 |
| 5,612,527 | 3/1997 | Ovadia | 235/383 |
| 5,630,127 | 5/1997 | Moore et al. | 395/615 |
| 5,687,322 | 11/1997 | Deaton et al. | 705/14 |
| 5,774,868 | 6/1998 | Cragun et al. | 705/10 |
| 5,848,396 | 12/1998 | Gerace | 705/10 |
| 5,873,068 | 2/1999 | Beaumont et al. | 705/14 |

OTHER PUBLICATIONS

"Database Marketing: A new Approach to the old relationship"; Chain Store Age Executive Edition, p. s48, Sep. 1991.

Rossi et al; "The Value of purchase History Data in Targeting Marketing"; Marketing Science/vol. 15, pp. 321–340, Apr. 1996.

Labe, Jr., R.P., "Database Marketing Increases Prospecting Effectiveness at Merrill Lynch," *Interfaces*, vol. 24, No. 5, Sep.–Oct. 1994, pp. 1–12.

*Primary Examiner*—Allen R. MacDonald
*Assistant Examiner*—Romain Jeanty
*Attorney, Agent, or Firm*—Whitham, Curtis & Whitham; Stephen C. Kaufman, Esq.

[57] ABSTRACT

Prospective customers may be selected for target making with respect to a particular product and market without the need to conduct designed marketing campaigns. A computer implemented process applies data mining techniques to databases containing records representing customer and overall market populations for the purpose of selecting market segments and prospective customers for targeted marketing.

8 Claims, 3 Drawing Sheets

PROSPECTIVE CUSTOMER SELECTION USING CUSTOMER AND MARKET REFERENCE DATA

BACKGROUND OF THE INVENTION

1. Field of the Invention

The present invention generally relates to a method for selecting prospective customers from a large pool of candidates. More particularly, this invention pertains to a computer implemented process that applies data mining techniques to databases containing data records representing customer and overall market populations for the purpose of selecting market segments and prospective customers for targeted marketing.

2. Background Description

An important aspect of marketing research is understanding demographic characteristics of those who are buying a product of interest. Developing such product-market insight allows for the design for new products, the identification of cross selling opportunities, and more importantly, the identification of prospective new customers. In the latter case, it is desirable to measure a subject's "propensity to buy" a particular product given his demographic characteristics. Developing such a measure using statistical methods requires training data which includes data for those who bought the product as well as for those who did not when given an opportunity to do so. Such buyer versus non-buyer data is either nonexistent or expensive to collect and typically requires conducting well-designed experimental marketing campaigns.

On the other hand, many companies have extensive collections of data for their customer base. For example, insurance companies keep records of each of their policy holders, including a customer's business transactions as well as demographic characteristics that are relevant to the policy. Also, there exist companies that provide general marketing data, such as demographic data for the majority of United States households.

To know their customers better, it is common for companies to have their customer data enriched with the corresponding household demographic data from external data suppliers. However, the use of such enriched data is limited, often confined to creating statistical models of customer behavior such as purchase amount and customer loyalty. Such models are of little use for identifying prospective new customers for the purpose of expanding the customer base.

SUMMARY OF THE INVENTION

It is therefore an object of the present invention to provide a method for selecting prospective customers with respect to a particular product and market without the need to conduct designed marketing campaigns.

The method according to the invention takes advantage of the available customer data as well as demographic data that characterizes the overall market population, and provides an intuitive measure to guide in the selection of marketing targets.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
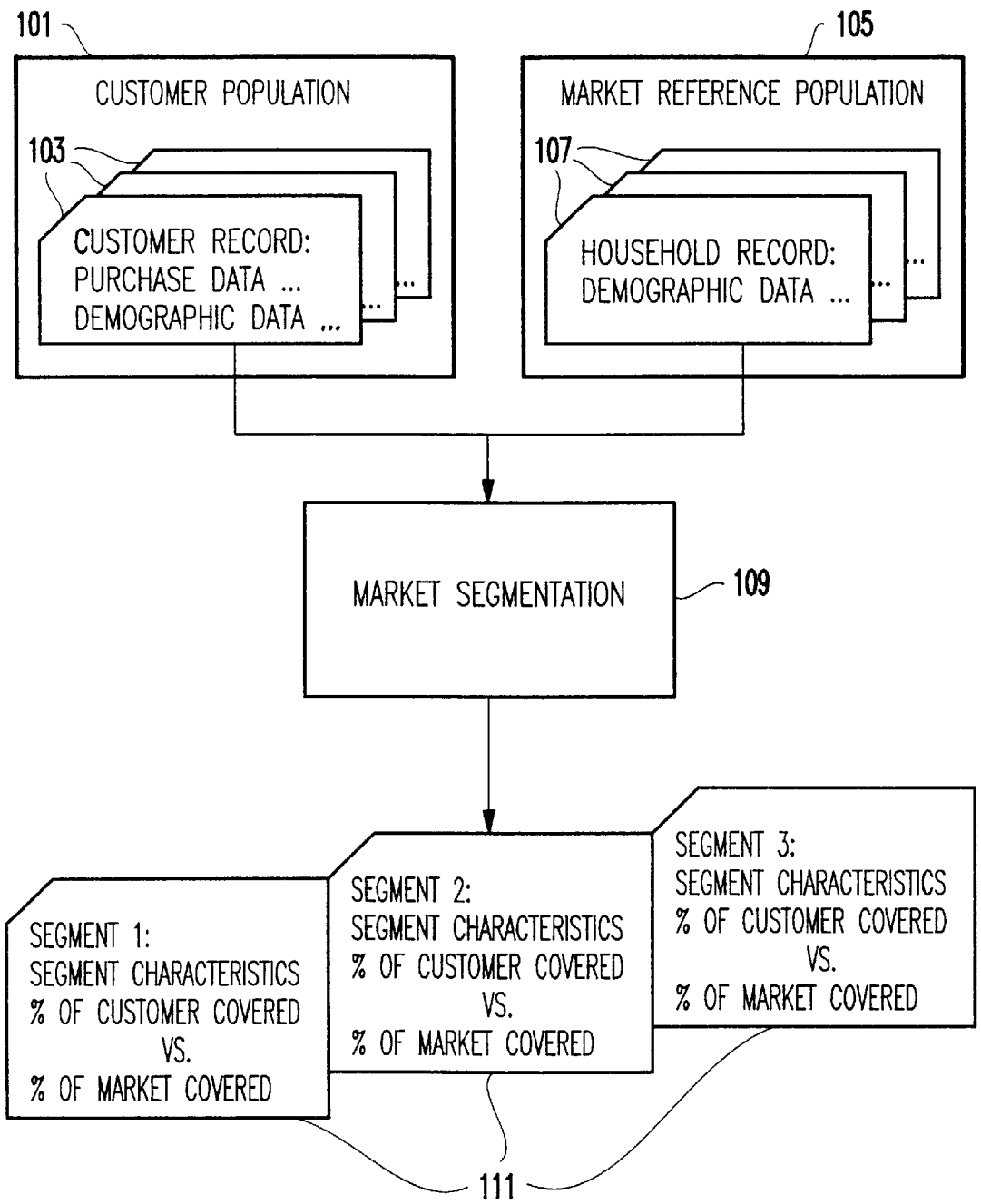
FIG. 1 is a flow char t illustrating the first part of the inventive method.

Referring now to the drawings, and more particularly to FIG. 1, there is shown a flow chart of the data mining process which makes up the first part of the inventive method. The data mining process obtains a list of market segments which cover the entire database. Initially, input records for this process are divided into two groups: the customer population 101 made up of customer records 103 and the market reference population 105 made up of household records 107. Customer records 103 and household records 107 contain identical sets of demographic data. Both records 103 and reference population records 107 are marked with an additional variable which identifies whether the record is from the customer population or the reference population. For purposes of this discussion, this variable will be known as "CustomerFlag." The customer records may contain additional business data attributes, and the records from the overall market population may contain additional demographic information and contact information.

After the data is entered in customer records 103 and reference records 107, market segmentation as shown in block 109 occurs. The market segmentation process 109 divides the records into a set of segments (segments may be disjoint or overlapping, minor modifications will be made in later processing for overlapping segments). Each segment 111 is characterized by a set of demographic attribute values, such as head of household age or household income.

There are also certain statistics calculated for each segment as the result of data mining. A score, preferably the "market penetration rate", the ratio between the fraction of the customer population and the fraction of the overall market population that falls into the segment, may be calculated and used as a measure of the desirability of the segment with respect to the marketing campaign objective (i.e., expanding the customer base). A higher scoring segment indicates that, relative to segment size, the product is purchased or owned by more households in the segment compared to a lower scoring segment.

Intuitively, it is more likely to generate a sale when marketing to a household in a segment in which, historically, relatively many households have bought the product. Thus, the market penetration rate is the preferred score measure when expansion of the customer base is the objective of a marketing campaign.

Alternative measures such as the average revenue or profit per household, if total revenue or profit is of interest, can also be used as the score. A different scoring model can take into account the size of the market that a segment covers. This can be done by weighting the score obtained using the previous method with the fraction of the market population that the given segment covers.

The market segmentation process may be implemented with a "Tree Induction" algorithm or the like whereby the parameter space defined by the independent (explanatory) variables of the records is successively partitioned into disjoint regions based on a certain "purity" criteria. Here, the variable "CustomerFlag" is "1" when a record belongs to the customer population and "0" otherwise.

Using "CustomerFlag" as the dependent (predicted) variable and the common demographic attributes as the independent variables, a tree induction algorithm at each step splits the space by maximizing the purity measure (related to the mixture of customer and overall market records) of the split regions. The leaf nodes of the resulting tree represent a disjoint partition of the space. That is, a leaf node represents a market segment, the segments are disjoint, and the union of all segments is the union of the customer and overall market records. It is easy to calculate the "market penetration rate" as well as other interesting statistics for each segment.

Alternatively, other statistical clustering algorithms may be used for the data mining process. The same statistics can be calculated for each resulting segment. A tree induction algorithm is preferred since it tends to produce non-overlapping partitions efficiently for prospecting purposes, and the partitions are easy to interpret. On the other hand, the CLIQUE clustering algorithm (described in "Automatic Subspace Clustering of High Dimensional Data for Data Mining Applications", R. Arawal, J.

Gehrke, D. Gunopulos, and P. Raghavan, *Research Report*, RJ10101 (91917), IBM Almaden Research Center, San Jose, December 1997) offers similar advantages to tree induction algorithms, but the resulting segments can be overlapping. This may result in more segments to be considered in the second step.

Prospecting efficiency may be defined as the fraction of the market population that needs to be marketed to in order to achieve the marketing campaign objective.

Figure 2:
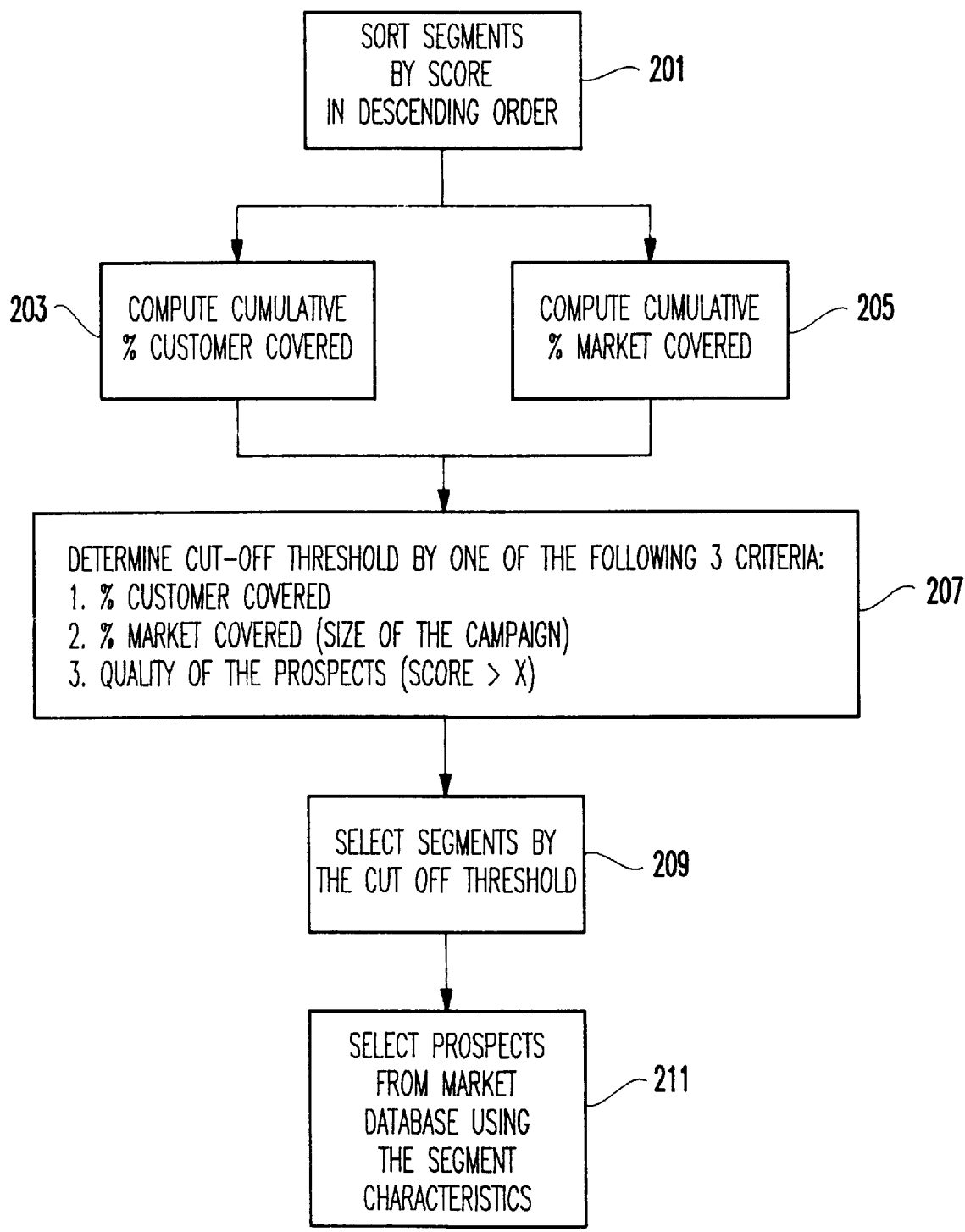
FIG. 2 is a flow chart illustrating the second part of the inventive method.

The flow chart in FIG. 2 illustrates the second part of the inventive method. In this process, the results of the first part of the inventive method described above are used to select market segments to target. As shown in the step in block 201, the segments are sorted by score in descending order. After sorting segments, cumulative statistics with respect to the sorted segments are calculated for both the customer population as shown in the step in block 203 and the market population as shown in the step in block 205. Each segment score represents a percentage of reference records and a percentage of customer records. To obtain the cumulative statistics for customer records, the summation of percentages of customer records is calculated at each segment score. This summation is calculated for reference records as well. Then, as shown in the step in block 207 a threshold is set. The threshold may be set based on either the percentage of customers covered, the percentage of the market covered, or the segment score.

At this point in the process, as shown in the step shown in block 209, the segments with scores higher than the threshold are selected and segment descriptions in terms of demographic attribute values are obtained. These form a set of criteria for belonging to the respective segments. Finally, as shown in the step in block 211 the household records that meet the criteria for belonging to any of the segment with a score higher than the threshold are selected as prospects for target marketing.

The invention is preferably implemented as a computer process executed on a computer system, including, for example, an IBM Personal Computer (PC), and an IBM RS6000 workstation, an IBM RS6000 SP2 multiprocessor system, or on an IBM S/390 system. The system, shown in generalized form in FIG. 3, includes at least one input device 307, at least a central processor unit 301, at least one storage device storing a database 302, memory 305 and at least one output device 303.

The input device 307 may be a workstation or terminal (e.g., a PC) equipped with a keyboard, a mouse, or the like, and appropriate software for allowing a user to select data used by data mining, to set thresholds for selecting segments to target, and to issue commands to control the process steps in accordance of the present invention.

Processor 301 may be of a conventional type sufficient to perform the calculation and to retrieve/store information from/to the database stored in the storage device 302 and memory 305 according to signals from the input device.

Storage device 302 may be any conventional storage device, such as a direct access storage device (DASD), such as a hard disk drive, a tape, compact disk (CD) read only memory (ROM), or the like, capable of storing data records therein of the type to be used in accordance with the present invention. Preferably, the customer and reference population records are stored in a database facilitating high speed data retrieval.

Figure 3:
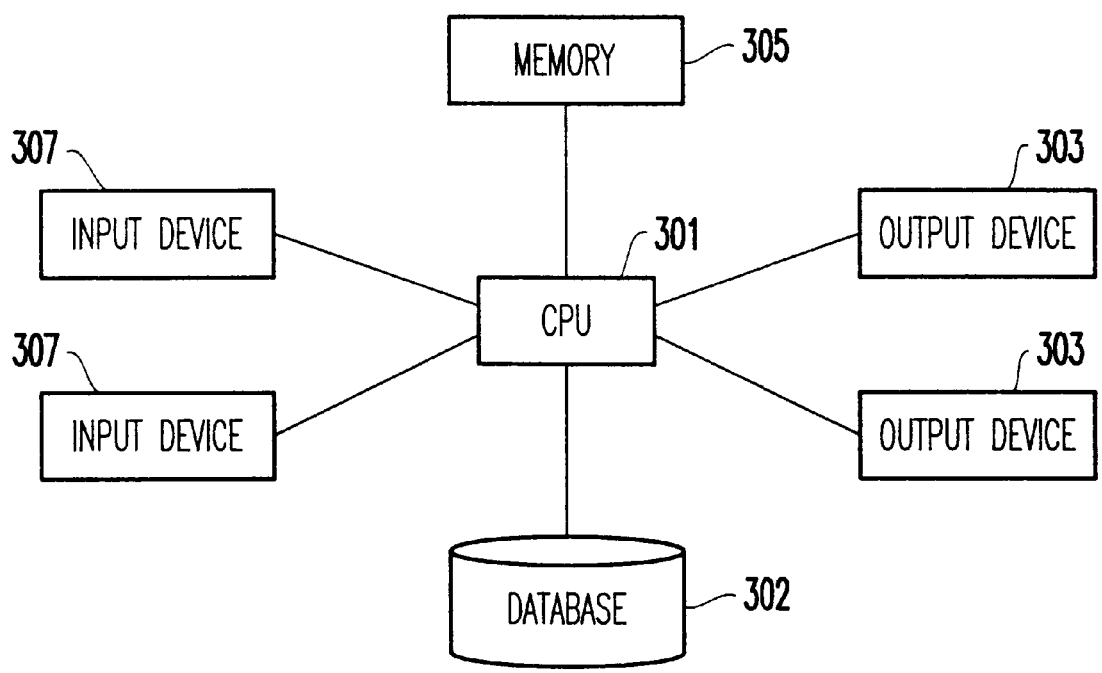
FIG. 3 is a block diagram showing a hardware platform on which the invention may be implemented.

As shown in FIG. 3, the system processor 301 accesses the database on storage device 302 and performs the sorting and calculations to output the segment descriptions, display the statistics, and generate prospect records. An output unit 303 may be a character or graphical display terminal, or various types of printing devices. If desired, the connections between input devices 307 and processor 301 may be bi-directional in nature, so that the input devices 307 may also serve as the output devices 303.

While the invention has been described in terms of a single preferred embodiment, those skilled in the art will recognize that the invention can be practiced with modification within the spirit and scope of the appended claims.

We claim:

1. A computer implemented method of selecting customers comprising the steps of:

selecting a reference market population;

inputting demographic data on a multiplicity of households in a reference market population;

selecting a customer population;

inputting demographic data on a multiplicity of customers in a customer population;

inputting a variable identifier to each of said multiplicity of customers in said customer population and to each of said multiplicity of households of said reference market population;

sorting said demographic data on said multiplicity of households and said multiplicity of customers by a multiplicity of segments, each said segment representing one or more demographic characteristics; and calculating a statistical score representing each of said segments from a ratio comparing an amount of said multiplicity of said customers to an amount of said multiplicity of said households, and using said statistical score to select a group of households from said reference market population.

2. The computer implemented method as in claim 1, further comprising the step of displaying the statistical score and prospect records based on the statistical score.

3. The computer implemented method as in claim 1, wherein said step of calculating a score includes the steps of:

determining a percentage of said customers represented in each segment; and determining determining a percentage of said households represented in each segment.

4. The computer implemented method as in claim 1 wherein said demographic characteristics are determined by a user's customer records.

5. The computer implemented method as in claim 1 further comprising the steps of:

sorting said segments by said score;

computing an amount of each of said multiplicity of customers for each of said segments;

for each of said segments, summing an amount of said multiplicity of customers covered by segments with scores bounded by score of said segment;

computing an amount of each of said multiplicity of reference records for each of said segments;

for each of said segments, summing an amount of said multiplicity of reference records covered by segments with scores bounded by score of said segment;

selecting segments based on a threshold score; and determining a target market based on a characteristic of said selected segments.

6. The computer implemented method as in claim 5, wherein said step of sorting said segments is by ascending score.

7. The computer implemented method as in claim 5, wherein said step of sorting said segments is by descending score.

8. A computer system for selecting customers comprising:

an input device for inputting demographic data on a multiplicity of households in a reference market population and demographic data on a multiplicity of customers in a customer population and inputting a variable identifier to each of said multiplicity of customers in said customer population and to each of said multiplicity of households of the reference population;

a central processor for sorting said demographic data on said multiplicity of households and said multiplicity of customers by a multiplicity segments, each said segment representing one or more demographic characteristics, said central processor further calculating a statistical score representing each of said segments from a ratio comparing an amount of said multiplicity of said customers to an amount of said multiplicity of said households; and an output device responsive to said central processor for displaying the statistical score and prospect records based on the statistical score.

\* \* \* \* \*